(12) United States Patent
Iovanna et al.

(10) Patent No.: US 9,794,129 B2
(45) Date of Patent: Oct. 17, 2017

(54) BUILDING TOPOLOGY IN COMMUNICATIONS NETWORKS

(75) Inventors: Paola Iovanna, Rome (IT); Gianpaolo Oriolo, Rome (IT); Cristiano Zema, Pisa (IT)

(73) Assignee: TELEFONAKTIEBOLAGET LM ERICSSON (PUBL), STOCKHOLM (SE)

( * ) Notice: Subject to any disclaimer, the term of this patent is extended or adjusted under 35 U.S.C. 154(b) by 617 days.

(21) Appl. No.: 14/358,144

(22) PCT Filed: Apr. 30, 2012

(86) PCT No.: PCT/EP2012/057911
§ 371 (c)(1),
(2), (4) Date: Jul. 23, 2014

(87) PCT Pub. No.: WO2013/079225
PCT Pub. Date: Jun. 6, 2013

(65) Prior Publication Data
US 2014/0328214 A1      Nov. 6, 2014

(30) Foreign Application Priority Data

Nov. 28, 2011  (EP) .................................... 11191023
Nov. 30, 2011  (EP) .................................... 11191435

(51) Int. Cl.
*H04L 12/24*  (2006.01)
*H04L 12/751*  (2013.01)
*H04L 12/725*  (2013.01)

(52) U.S. Cl.
CPC .............. *H04L 41/12* (2013.01); *H04L 45/02* (2013.01); *H04L 45/302* (2013.01)

(58) Field of Classification Search
None
See application file for complete search history.

(56) References Cited

U.S. PATENT DOCUMENTS

| | | | |
|---|---|---|---|
| 2006/0133300 A1* | 6/2006 | Lee | H04L 45/00 370/254 |
| 2007/0073805 A1* | 3/2007 | Jorgensen | H04L 1/20 709/203 |
| 2009/0285097 A1* | 11/2009 | So | H04Q 11/0062 370/235 |
| 2009/0285219 A1* | 11/2009 | Romrell | H04L 12/4633 370/395.41 |

(Continued)

FOREIGN PATENT DOCUMENTS

WO  WO-2009/118050  10/2009
WO  WO-2011/103913  9/2011

OTHER PUBLICATIONS

PCT International Search Report for Counterpart Application No. PCT/EP2012/057911, (dated Jun. 28, 2012), 4 pages.
(Continued)

*Primary Examiner* — Derrick Ferris
*Assistant Examiner* — Manuel Rangel
(74) *Attorney, Agent, or Firm* — NDWE LLP

(57) ABSTRACT

The present proposal provides a specific solution for communications network topology summarization with a good trade-off between high scalability, good stability and resources utilization efficiency.

9 Claims, 6 Drawing Sheets

(56) References Cited

U.S. PATENT DOCUMENTS

| | | | | |
|---|---|---|---|---|
| 2010/0085876 A1* | 4/2010 | Wright | ................ | H04L 12/4641 370/235 |
| 2010/0149971 A1* | 6/2010 | Noriega | ................. | H04L 47/10 370/230 |
| 2010/0214920 A1* | 8/2010 | Tewani | ................... | H04L 45/22 370/232 |
| 2012/0087377 A1* | 4/2012 | Lai | ......................... | H04L 45/04 370/427 |

OTHER PUBLICATIONS

Verdi, et al., "The Virtual Topology Service: A Mechanism for QoS-Enabled Interdomain Routing", *Autonomic Principles of IP Operations and Management Lecture Notes in Computer Science* vol. 4268, (2006), pp. 205-217.

Wang, et al., "An overview of routing optimization for internet traffic engineering", *Communications Surveys & Tutorials, IEEE* (vol. 10, Issue: 1), (2008), pp. 36-56.

Farrel, et al., "A Path Computation Element (PCE)-Based Architecture", *Network Working Group Request for Comments 4655*, http://www.ietf.org/rfc/rfc4655.txt, (Aug. 2006), 40 pages.

Kompella, K., et al., "Label Switched Paths (LSP) Hierarchy with Generalized Multi-Protocol Label Switching (GMPLS) Traffic Engineering (TE)", *Network Working Group, Request for Comments: 4206, The Internet Society*, (Oct. 2005), 14 pages.

Le Roux, et al., "Evaluation of Existing GMPLS Protocols against Multi-Layer and Multi-Region Networks (MLN/MRN)", *Network Working Group, Request for Comments: 5339*, (Sep. 2008), 25 pages.

Lee, et al., "Framework for GMPLS and Path Computation Element (PCE) Control of Wavelength Switched Optical Networks (WSONs)", *Internet Engineering Task Force (IETF), Request for Comments: 6163, IETF Trust*, (Apr. 2011), 51 pages.

Nishioka, et al., "Use of the Synchronization VECtor (SVEC) List for Synchronized Dependent Path Computations", *Internet Engineering Task Force (IETF), Request for Comments: 6007, IETF Trust*, (Sep. 2010), 18 pages.

Oki, et al., "Framework for PCE-Based Inter-Layer MPLS and GMPLS Traffic Engineering", *Network Working Group, Request for Comments: 5623, IETF Trust*, (Sep. 2009), 34 pages.

Papadimitriou, et al., "Generalized MPLS (GMPLS) Protocol Extensions for Multi-Layer and Multi-Region Networks (MLN/MRN)", *Internet Engineering Task Force (IETF), Request for Comments: 6001, IETF Trust*, (Oct. 2010), 24 pages.

Shiomoto, K., et al., "Procedures for Dynamically Signaled Hierarchical Label Switched Paths", *Internet Engineering Task Force (IETF), Request for Comments: 6107, IETF Trust*, (Feb. 2011), 30 pages.

Shiomoto, et al., "Requirements for GMPLS-Based Multi-Region and Multi-Layer Networks (MRN/MLN)", *Network Working Group, Request for Comments: 5212*, (Jul. 2008), 28 pages.

International Preliminary Report on Patentability, Application No. PCT/EP2012/057911, dated Jun. 12, 2014, 9 pages.

* cited by examiner

BUILDING TOPOLOGY IN COMMUNICATIONS NETWORKS

CROSS-REFERENCE TO RELATED APPLICATIONS

This application is a National stage of International Application No. PCT/EP2012/057911, filed Apr. 30, 2012, which claims priority to European Application No.11191435.4, filed Nov. 30, 2011, and European Application No.11191023.8, filed Nov. 28, 2011, which are hereby incorporated by reference.

TECHNICAL FIELD

The present invention relates to communications networks, in general, and in particular to multi-domain communications networks.

BACKGROUND

Next Generation Networks are large, complex and heterogeneous structures and the relative control plane should automatically and dynamically provide end-to-end connections spanning domains, technology regions and layers.

The main standardization bodies (IETF, OIF and ITU) are addressing several aspects of routing in a multi-domain/multi-technologies scenario, where a single domain can also be multi-layer (i.e. a Wavelength-Switched Optical Network, WSON, domain with packet interfaces at its borders). The common approach followed for multi-layer, multi-technology and multi-domain networks is mainly based on the division of the network resources into "technology regions" (e.g. optical and packet regions), having hierarchical server-client relations. On such architecture, the Generalised Multiprotocol Label Switching, GMPLS, protocol suite, with the relative extensions for each technology and layer, should allow a homogeneous control of portions of the network, which are heterogeneous both technologically and administratively.

The large amount of network elements and their management complexity imply a set of scalability issues both for routing and for signaling protocols. As a matter of fact, the amount of information to be distributed and the frequency of updates increase the overhead of the entire network signaling and thus the bandwidth request and the computational power consumed. On the other hand, poor information (e.g. Traffic Engineering, TE, information not transmitted from one hierarchical layer to another one or a too generic resource virtualization) can lead to an inefficient resources utilization and to a high blocking probability (i.e. the probability that a connection seen as feasible at a higher hierarchical level can not be provided, because of a lack of resources in the lower level).

Moreover, different domains can be administrated by different carriers as well, resulting in a set of confidentiality issues due to strong commercial reasons that refrains a domain administrator to disclose all the details of its intra domain topology.

However a common view of these complex topics has not been proposed so far and a set of issues are still to be fixed.

As a first step for providing a framework for hierarchical architectures with resources' summarization a patent application WO2011/103913A1 has been filed, defining a general hierarchical architecture with service-oriented parameters. This patent application addresses the issue of defining a general architecture and a common set of parameters, but it does not specify any method to perform resource summarization.

In order to fix the scalability issue in multi-region and multi-carrier scenarios, the design of hierarchical architectures, based on Path Computation Elements (PCEs), seems to be a promising approach, currently under standardization.

However, such approach is not completely defined and technology-specific extensions are still needed. Moreover, End-To-End, E2E, path computation procedures should be further improved and extended in order to work efficiently also on summarized topologies.

Concerning the topology summarization concept itself, a set of guidelines are expressed in the standards, but they only indicate that a domain can be summarized as a single node, as a full mesh of links interconnecting some border nodes, or some generic intermediate solution. Moreover, the domain summarization is actually mainly considered as an enabler for preliminary considerations such as the domains' chain definition, not exploiting its real potential.

Another important lack of the existing solutions is that, for both PCE hierarchical architectures and domains summarization, standards only provide guidelines and general approaches. As a matter of fact, there is no common view with any specific solutions or defined framework addressing all the issues of Multi-Layer, Multi-Region, Multi-Vendor and Multi-Domain Networks.

As mentioned in the previous section, the patent application WO2011/103913A1 has been filed as a first step for providing a framework for hierarchical architectures with resources summarization. It describes a general hierarchical architecture to summarize domain topologies in a multi-domain and multi-technology context to be used for E2E solutions. Main concepts of WO2011/103913A1 are:

Architectural definition of specialized PCEs, summarizing the intra-domain topologies, and inter-domain external PCE, working on a summarized view of the topologies.

Definition of service-based parameters to be used for the summarization of each domain, acting as "umbrella" parameters for different technologies.

WO2011/103913A1 addresses the issue of defining a general architecture and a common set of parameters; however it does not specify any method to perform an efficient resource summarization.

SUMMARY

The present invention provides a specific solution for communications network topology summarization with a good trade-off between high scalability, good stability and resources utilization efficiency.

These features are very important added values for E2E connectivity provisioning in Multi-Layer, Multi-Region, Multi-Vendor and Multi-Domain Networks. As a matter of fact, in such contexts, is not trivial to find a good trade-off between the level of abstraction (improving scalability), the stability (reducing the amount of signaling) and the adequate level of detail for optimizing resources' utilization and reducing the blocking probability (due to failed attempts to setup a connection based on non consistent topology information). The invention seeks to preferably mitigate, alleviate or eliminate one or more of the disadvantages mentioned above singly or in any combination.

Accordingly, the invention seeks to preferably mitigate, alleviate or eliminate one or more of the disadvantages mentioned above singly or in any combination.

According to a first aspect of the present invention there is provided a method of building a summarised topology of a communications network. The method comprises the steps of receiving CoS settings, traffic information and traffic demands for traffic between pairs of border nodes. The method also comprises building an Expected Traffic Matrix, EM, and routing traffic demands represented in the Expected Traffic Matrix; creating a path and assigning the path to one of CoS baskets for traffic demands in the EM matrix, where the CoS baskets represent different Classes of Service. Furthermore the method comprises associating each CoS basket with a Summary Link connecting a pair of border nodes, wherein the Summary link represents a set of connections and building a summarised topology of the network, wherein pairs of border nodes are linked by the Summary Links corresponding to the CoS baskets.

According to a second aspect of the present invention there is provided a device for building a summarised topology of a communications network. The device comprises an interface adapted to receive Class of Service, CoS, settings, traffic information and traffic demands for traffic between pairs of border nodes and a processor adapted to build an Expected Traffic Matrix, EM, and route traffic demands represented in the Expected Traffic Matrix, EM. The processor is further adapted to create a path and assign the path to one of CoS baskets for traffic demands in the EM matrix, where the CoS baskets represent different Classes of Service. The processor is also adapted to associate each CoS basket with a Summary Link connecting a pair of border nodes, wherein the Summary link represents a set of connections. The device further comprises a topology module adapted to build a summarised topology of the network, wherein pairs of border nodes are linked by the Summary Links corresponding to the CoS baskets.

Further features of the present invention are as claimed in the dependent claims.

BRIEF DESCRIPTION OF THE DRAWINGS

The present invention will be understood and appreciated more fully from the following detailed description taken in conjunction with the drawings in which.

DETAILED DESCRIPTION

Figure 1:
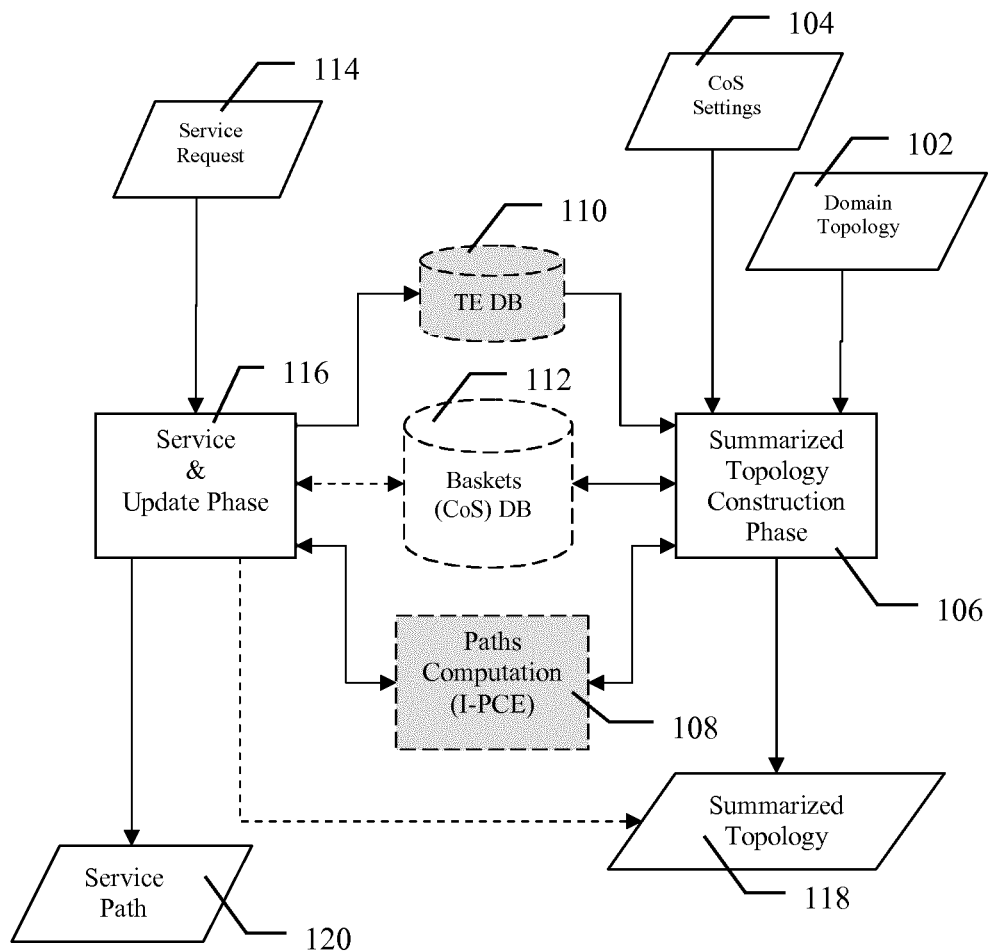
FIG. 1 is a diagram illustrating two phases of the method in one embodiment of the present invention.

The purpose of the current invention is to define an efficient method to provide a summarized domain topology, allowing an efficient routing in multi-domain contexts with heterogeneous technologies such as packet and optical.

Particularly, a detailed method is provided, in order to summarize the domain's connectivity by a set of baskets, representing different Class of Services (CoS), which are described with service-oriented and economic-driven parameters.

Moreover, the intra-domain paths for filling the CoS baskets are computed and clustered in innovative and efficient way, with the goal of achieving a good trade off between the following contrasting targets:

High scalability: this target is achieved by representing a large set of connections between a given couple of border nodes, BNs, as a small number of Summary Links, with different characteristics. This way, the topology of a domain is kept small and, at the same time, its connectivity capabilities are clustered into different Class of Services (CoS);

Stability (i.e. robustness to network resources status): this target is achieved by a set of sub-sequential expedients. First, the intra-domain paths for filling the baskets are chosen having the minimum (ideally no) mutual influence, so that the resources of one path don't impact other ones. As a second expedient, the parameters to be advertised correspond to a large set of intra-domain paths, so that the advertised parameters would not be updated even if a large number of similar connections are requested. Finally, when crossing a given threshold for the number of still available paths corresponding to the advertised parameters, a specific path computation is triggered, in order to refill (if possible) the baskets instead of modifying the advertised parameters;

Confidentiality: this target is achieved by hiding the number, type and Traffic Engineering, TE, characteristics of the intra-domain paths. As a matter of fact, only the availability of an undefined set of connections, with some delay and bandwidth characteristics is advertised, with no details about their composition, TE parameters, etc. ;

Resources' utilization efficiency: this target is achieved by providing an adequate level of detail of the service-oriented characteristics (i.e. bandwidth and delay). That allows the knowledge of some surely met requirements (i.e. the guaranteed bandwidth and the E2E delay range advertised for each SL).

As a result, given a domain with its topology and available resources, it is possible to build a scalable, stable and efficient mesh topology of Border Nodes (BNs), interconnected by Summary Links (SLs), each one of them representing a whole set of connections.

Moreover, such summarized topology and corresponding service parameters can be provided taking into account intra-domain policies and proper physical constraints (e.g. all connections can be pre-computed in advance, partially computed in advance or completely computed real time). The internal parameters used for intra-domain routing can be physical impairments (in case of optical networks), or others. In this way inter-domain topology is "quasi-static" and based on homogenous parameters, while intra-domain routing is completely independent from other domains and is based on different parameters (e.g. available bandwidth, network load, etc.) with respect to inter-domain routing.

The proposed summarization method can be divided in two phases: a Summarized Topology Construction phase and a Service & Update phase.

As shown in FIG. 1 flowchart, given a domain topology 102 and the settings 104 related to the desired Class of Services (CoS), the Construction phase 106 interacts with the domain Internal PCE (I-PCE) 108 and the Traffic Engineering Database, TE DB, 110 in order to construct and fill the CoS Baskets 112, which will be advertised as Summary Links (SL) 118 with service-oriented and cost-based parameters. Given a service request 114, the Service & Update phase 116 selects the adequate path 120 belonging to the relevant CoS (i.e. Basket) and, if needed, updates the basket database 112 and/or the parameters advertised for the summarized topology 118. In the following, the two phases will be explained in details. The advertised Summary Links 118 are virtualisations of real intra-domain paths. From interdomain point of view the invention in its embodiment considers links connecting border nodes, but such links represent physical paths that cross physical nodes into each domain.

Summarized Topology Construction Phase

Figure 2:
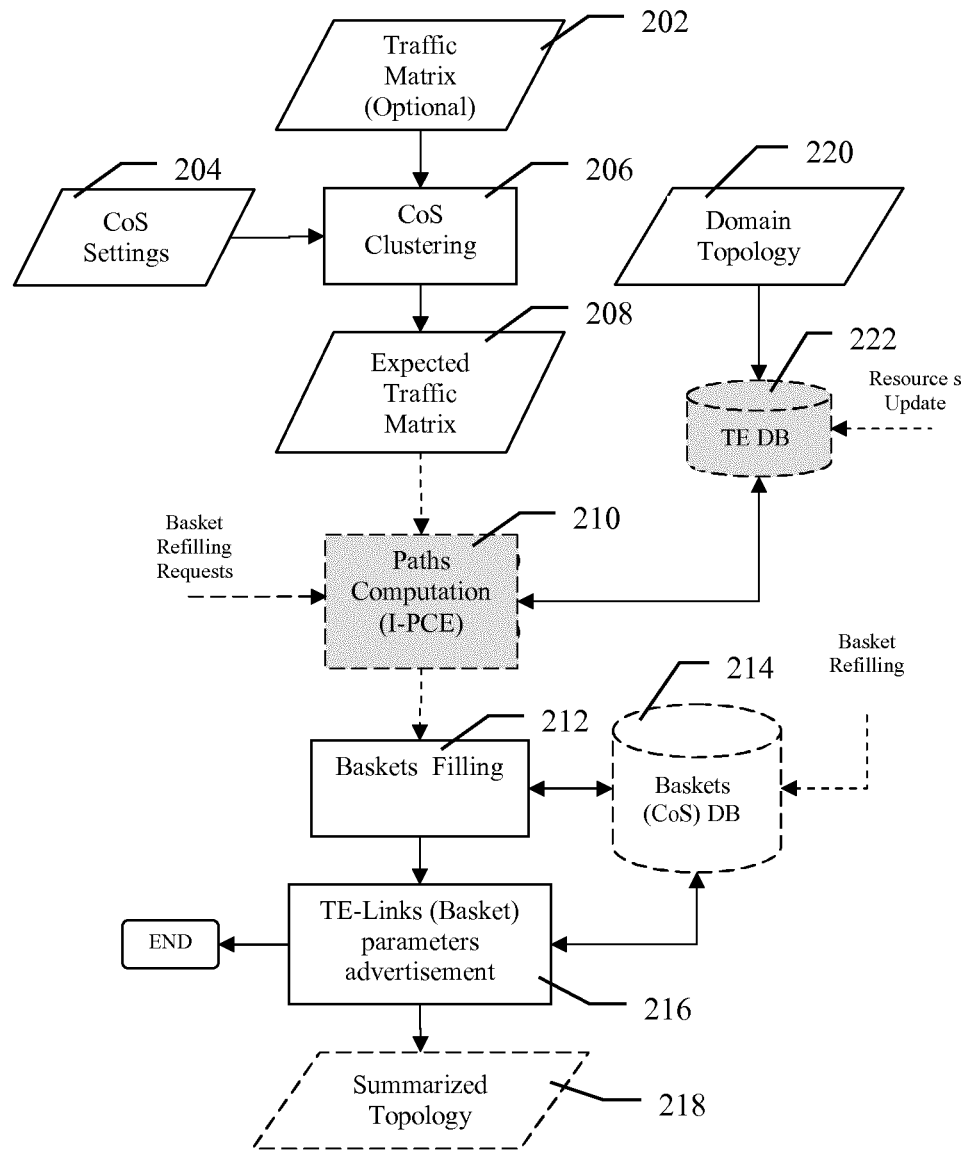
FIG. 2 is a diagram illustrating construction phase of the method in one embodiment of the present invention.

As shown in the flow chart of FIG. 2, describing this phase of the summarization method, an Expected Traffic Matrix EM is built, based either on an optional traffic matrix provided as input or stochastic distributions. Each traffic demand in EM is between border nodes and comes with a bandwidth and a delay request.

The demands for each pair of border nodes, are clustered 206 into classes according to service parameters (e.g. delay and bandwidth ranges) provided as input. The set of specific services parameter defines a Class of Services (CoS) also known here as CoS settings 204. For the sake of simplicity, but without any loss of generality, in the following we consider a partition of the demands from a given border node u to a given border node v into 6 classes associated with 6 baskets as follows:
- 3 Delay classes: DL-H (high), DL-M (medium) or DL-L (low). More in detail, each delay class will correspond to an interval of delays, where DL stands for delay;
- 2 Bandwidth classes: BW-H (high), specified by the interval [1, b(mid)] or BW-L (low), specified by the interval [b(mid)+1, b(max)], where BW stands for bandwidth.

The six CoS baskets are formed by all possible combinations of the three delay classes and two bandwidth classes.

Figure 3:
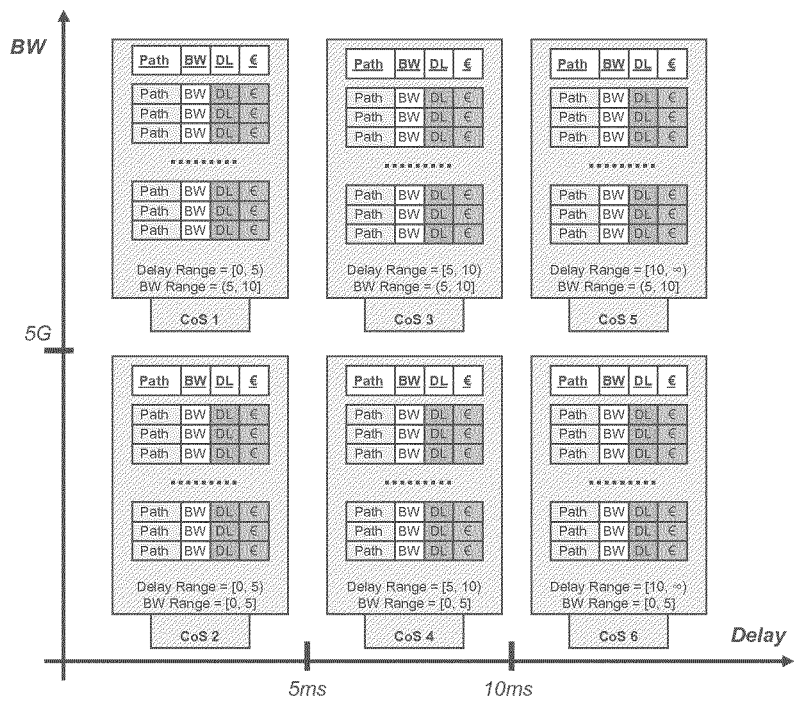
FIG. 3 and FIG. 4 illustrate CoS baskets in one embodiment of the present invention.

An example of such basket classification is shown in FIG. 3.

In order to build EM 208 the following assumptions are made:
- for each ordered pair (u,v) of border nodes the number of traffic demands in EM from u to v is a same number 6K;
- in its turn, the 6K traffic demands from u to v is made of 6 sets of traffic demands of size K, i.e. one set for each basket;
- the bandwidth of the K traffic demands in one (out of six) basket B from u to v follows a Poisson distribution with expected value bw(u,v,B), where bw(u,v,B) is consistent with the interval of bandwidth values for basket B. That should improve the stability of the overall system, because there would be a sufficient number of paths of bandwidth bw(u,v,B), which would be the more frequent value (and therefore the one that would probably be advertised as Guaranteed, as explained in the following).

Given the expected traffic matrix EM, the solution tries to route as many demands as possible, while minimizing the congestion on the network. Again, the goal of this function is to improve the stability of the overall system by computing paths that, once selected to serve a service request, would not affect other ones' resources, minimizing the need of updating the baskets' parameters to be advertised.

This step should be performed by the domain Internal PCE (I-PCE) 210 using information about domain topology 220 and information available from a Traffic Engineering Database, TE DB. 222. The domain Internal PCE (I-PCE) 210 performs a successive shortest paths algorithm, working as follows:
- the set of demands are first ordered according to some heuristic criterion that maximize the number of successful path computations
- at each stage i, the i-th demand is routed. This will be done on a residual network G(i), as the demands that have been routed through stages 1 . . . i-1 have already consumed some of the network resources. In particular, each link of G(i) will have a dynamic congestion cost taking into account the congestion of that link so far. So, if the i-th demand d is from u to v, the algorithm will look for a shortest path from u to v in the network G(i) with respect to the congestion costs. Such a path will be found via a constrained Dijkstra algorithm (the constraints guarantee that the routing paths are consistent with the delay class of d).

For each traffic demand d in the expected traffic matrix EM that has been routed, there is a path P that will be put in a suitable basket 212. Each path P in the basket will have its own bandwidth (corresponding to the bandwidth of the demand of EM routed through P by the routing algorithm) and class of delay (again corresponding to an interval of delays). The baskets are therefore filled with the paths computed by I-PCE according to the EM matrix, building a baskets (i.e. CoS) database 214.

Each basket (i.e. CoS) is then associated to a Summary Link (SL) connecting the Border Nodes u and v in the Summarized Topology. Such SLs (i.e. baskets) are characterized by the following set of service-oriented advertised 216 parameters:
- Delay class DLclass(B): this parameter is the delay class of the basket B. This parameter is of course static;
- Bandwidth class BWclass(B): this parameter is the bandwidth class of the basket B. This parameter is of course static;
- Guaranteed bandwidth guar(B): this parameter is chosen as the most frequent bandwidth in the basket B. (Note that, at the beginning, this value very likely will be equal to the expected value bw(u,v,B) of the demands in the basket B). This parameter is dynamic;
- Peak bandwidth peak(B): this is the maximum bandwidth of the paths of the basket B (therefore it can be different from either b(mid) or b(max) if there is no path in the basket with such bandwidth). This parameter is a quasi-static one, because it will be refreshed only if there is some update for the dynamic value (guar(b)). Therefore it is possible that no path currently available in the basket has that bandwidth;
- Guaranteed bandwidth cost G-cost(B): this parameter is indicative of the (economic) cost of selecting a path with bandwidth equal to guar(B) among the ones in the basket B. This cost can be an economic-driven one, set by the domain administrator. For the sake of simplicity, but without any loss of generality, from now on we will consider the ratio between the guaranteed bandwidth and 100 times the average delay of paths in the basket (the latter value is taken as static, i.e. it does not depend on the paths currently available in the basket). This parameter is a dynamic one.
- Peak bandwidth cost P-cost(B): this parameter is indicative of the (economic) cost of selecting a path with bandwidth equal to peak(B) among the ones in the basket B. This cost can be an economic-driven one, set by the domain administrator. For the sake of simplicity, but without any loss of generality, from now on we will consider the ratio between the peak bandwidth and 100 times the average delay of paths in the basket (the latter value is taken as static, i.e. it does not depend on the paths currently available in the basket). This parameter is a quasi-static one.

To clarify the meaning of the above described parameters, let's consider an example, where a basket B is supposed to be filled with 20 paths. In the example, the basket B, corresponding to CoS 1, is filled with 20 paths (P1-P20) having a delay belonging to the interval [0,5) and a bandwidth belonging to the interval [5,10], so such intervals are advertised as DLclass(B) and BWclass(B) respectively.

Figure 4:
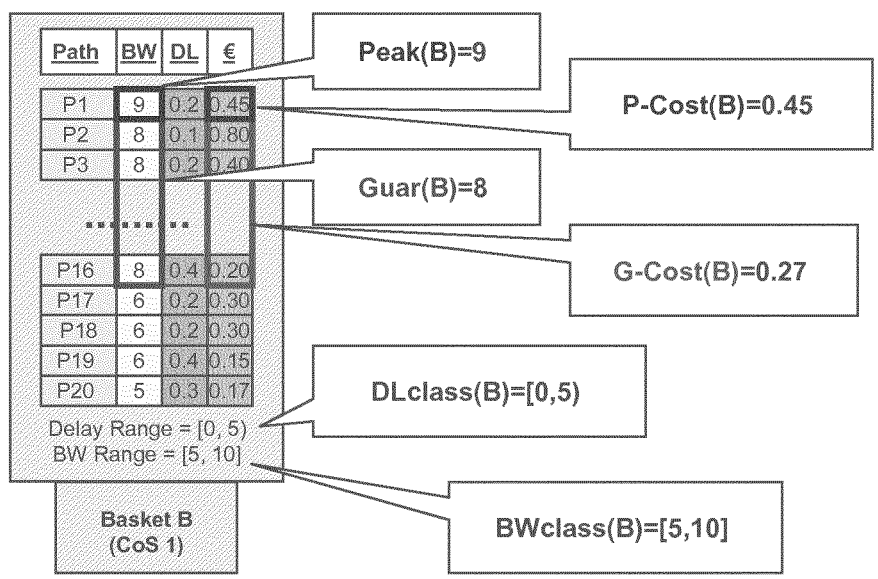

Let's suppose that the bandwidth of the demands served by the considered basket B follows a Poisson distribution with expected value equal to 8, so that 15 paths (P2-P16) out of 20 have a bandwidth equal to 8. Let's suppose also that the path with higher bandwidth (P1) has a bandwidth equal to 9 and a delay equal to 0.2, while the mean delay of the paths P2-P16 is equal to 0.3. In such situation the advertised parameters for the basket B would be the ones shown in FIG. 4.

As a final step, the requested Summarized Topology is built. Such summarized topology synthesizes the domain by a full mesh whose nodes are the border nodes and such that for each ordered pair of border nodes (u, v) there are 6 links from u to v, each one corresponding to one basket.

Figure 6:
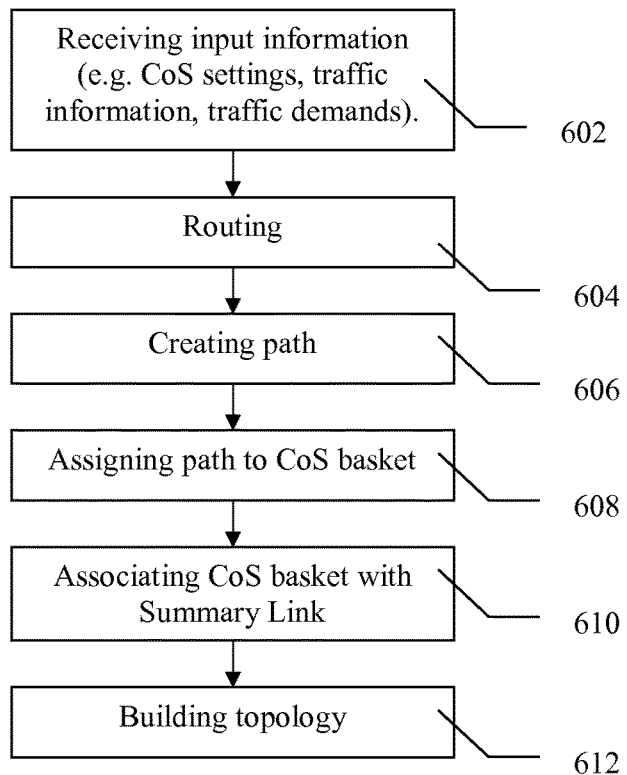
FIG. 6 is a diagram illustrating a method of building a summarised topology of a communications network in one embodiment of the present invention.

FIG. 6 illustrates the method of building a summarised topology of a communications network according to one embodiment of the present invention. As explained earlier the method includes a step of receiving input information, 602, and this includes CoS settings, traffic information and traffic demands for traffic between pairs of border nodes. The input information may be received in various ways: as a combined input with all the information is one file or package, or separately. The way the input information is received or order in which data is input is not critical for operation of the method. In the following step an Expected Traffic Matrix EM is built and traffic demands represented in the Expected Traffic Matrix EM are routed, 604. For traffic demands in the EM matrix the method comprises creating 606 a path and assigning, 608, the path to one of CoS baskets, where the CoS baskets represent different Classes of Service. In a preferred embodiment in steps 606 and 608 a path is created and assigned to a CoS basket for each traffic demand in the EM matrix.

A following step comprises associating, 610, each CoS basket with a Summary Link connecting a pair of border nodes, wherein the Summary link represents a set of connections. Alternatively, only some of the CoS baskets are associated with their corresponding Summary Links, e.g. when there are no connections between pair of border nodes that would meet the CoS criteria of the CoS basket and in consequence there is no Summary Link that could be associated with this CoS basket. This may happen, for example, when an optical fibre connecting a pair of border nodes is broken.

Finally the method comprises building, 612, a summarised topology of the network, wherein pairs of border nodes are linked by the Summary Links corresponding to the CoS baskets.

Figure 7:
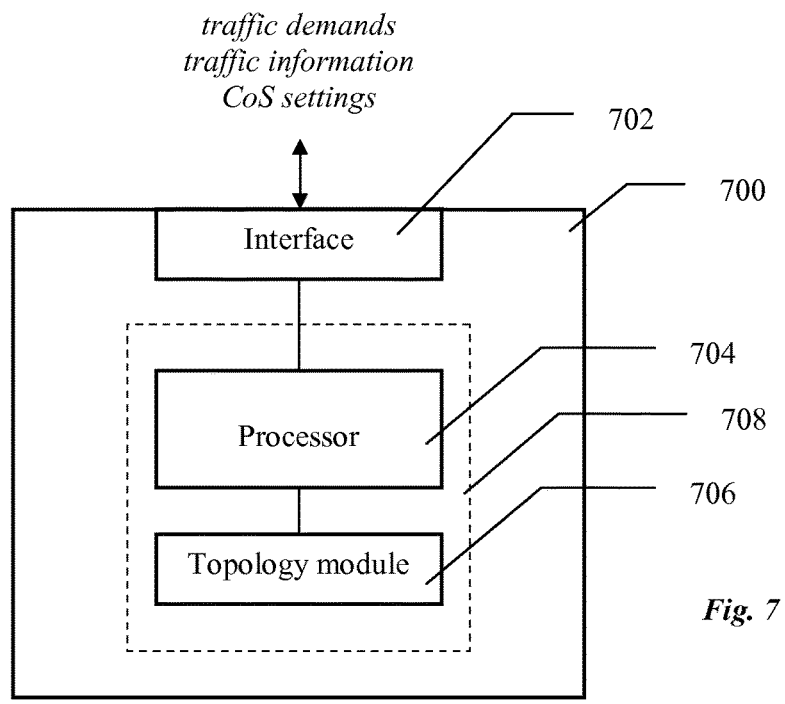
FIG. 7 is a diagram illustrating a device for building a summarised topology of a communications network in one embodiment of the present invention.

FIG. 7 illustrates a device, 700, for building a summarised topology of a communications network in accordance with one embodiment of the present invention. In one embodiment the device is an Internal Path Computation Element (I-PCE). The device, 700, comprises an interface, 702, adapted to receive Class of Service, CoS, settings, traffic information and traffic demands for traffic between pairs of border nodes. The device further comprises a processor, 704, adapted to build an Expected Traffic Matrix, EM, and route traffic demands represented in the Expected Traffic Matrix EM. The processor, 704, is further adapted to create a path and assign the path to one of CoS baskets for traffic demands in the EM matrix, where the CoS baskets represent different Classes of Service. The processor, 704, is also adapted to associate each CoS basket with a Summary Link connecting a pair of border nodes, wherein the Summary link represents a set of connections. The device further comprises a topology module, 706, adapted to build a summarised topology of the network, wherein pairs of border nodes are linked by the Summary Links corresponding to the CoS baskets.

In one embodiment the processor 704 and the topology module 706 are implemented as separate elements and in an alternative embodiment the processor 704 and the topology module 706 are implemented as one hardware element 708. In a preferred embodiment the hardware element 708 is a processor having adequate processing power to realise the functions of both elements 704 and 706.

Service & Update Phase

As an example, an application of the proposed summarization method could be a PCE hierarchy in a multi-domain context, where the parent PCE is responsible for the inter-domain path computation on a topology, which is composed by a set of domains' summarized topologies. In this example, the parent PCE, called External PCE (E-PCE), selects an E2E path that is suitable for a given traffic demand, according to its service class (i.e. the bandwidth and delay requirements of the demand) and having the minimum cost.

Therefore, each traffic demand, which is specified by a source, a destination, and bandwidth q, can be associated to a basket B that is compatible with its features. A traffic demand with a set of service parameters is also known as a service demand.

If the value q is less or equal than the guaranteed bandwidth guar(B) of B, the demand will certainly be routed. Else, it will be checked if there is some path in the basket that has enough bandwidth to serve the demand: if not, the request will be discarded.

Figure 5:
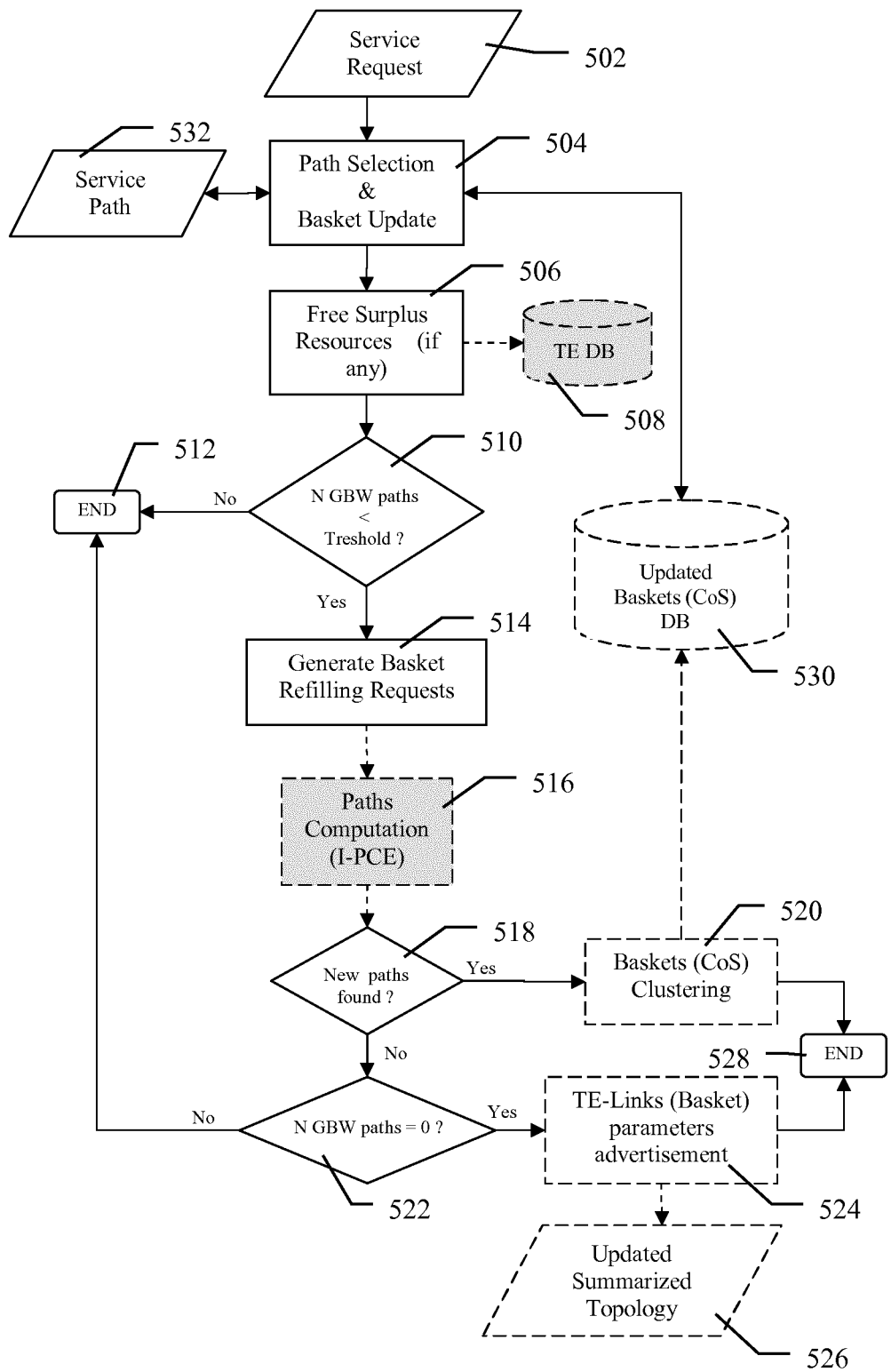
FIG. 5 is a diagram illustrating service and update phase of the method in one embodiment of the present invention.

As shown in FIG. 5, if the demand 502 can be served, the path P 532 in the basket 530 with the smallest bandwidth greater than q will be chosen 504 and the residual bandwidth will be made available again, as explained in the following.

The service demand will be routed on the selected path P. Therefore the path P becomes the service path for that traffic demand and the relative basket 530 will be updated, as shown in the Service & Update phase flow chart of FIG. 5.

After selecting a path P as the service path for a given traffic demand, the path P will be removed from the sets of path available in the basket 530. That action can lead to different kinds of updates 504 for the basket B from which the path P was selected, as described in the following.

The surplus resources (if any) will be released 506 and made available again in the TE DB 508. That can happen if, as an example, the path P was computed with a bandwidth greater than the demand's one. A Label Switched Path, LSP, that will effectively be setup, after the selection of path P as the service path, will reserve only the required bandwidth (i.e. q) so the surplus will be considered available for future reservations.

In order to improve the stability of the system, the goal of the proposed summarization method is to minimize the opportunity to change the dynamic parameters advertised (i.e. the guaranteed bandwidth and the associated cost). To do so, the number of paths in the basket B with a bandwidth equal or higher then Guar(B) will be monitored 510 in order to check if it is above a given threshold (e.g. set by the domain administrator).

If yes, there is no need to refill the basket B or to update its advertised dynamic values 512.

If not, new paths to refill the basket will be searched 514. The refill will be made along the same lines as above. Therefore, a new set of K (estimated) demands (i.e. the refilling request 514 in the flow chart) that are compatible with the basket parameters (i.e. in terms of bandwidth and delay) are built. Particularly, the demands will be built with the goal of looking for paths with bandwidth equal to Guar(b) (i.e. the ones that, if found, will produce any change in the advertised basket parameters).

Then, the K demands are routed via the I-PCE routing algorithm 516, with the constraint that resources assigned to paths that are currently in some basket are unavailable (note that the surplus resources, instead, are again available).

If some path with the desired characteristics is found 518, then the basket B is refilled 520 with them and no update for its advertised dynamic values is needed, 528.

If no path with the desired characteristics is found, the basket B cannot be refilled. Therefore, it will be checked 522 if there are still paths with a bandwidth greater or equal to Guar(B) in the basket B.

If yes, then there is not yet the need to update the advertised dynamic values of basket B, 512.

If no, then a bandwidth equal to Guar(B) can no more be guaranteed, and therefore both the Guar(B) and G-cost(B) dynamic values of basket B must be updated, 524, modifying the resources of the summarized topology of the considered domain, 526.

That way, the advertised value of Guar(B) doesn't need to be updated until the I-PCE is no more able to find paths to refill the basket AND there are no more paths with a bandwidth greater or equal to Guar(B) in the basket B.

It's worth to notice that the stability of the overall system is achieved through a set of expedients performed in almost each step of the proposed summarization method.

As a first thing, the paths connecting BNs are computed according to the principle of minimum sharing of resources (ideally no sharing at all); then the dynamic values of each basket are chosen as the more frequent ones, taking into account that they will be updated only in particular conditions (i.e. when some thresholds are crossed AND there are not enough resources in the domain to guarantee the advertised characteristic for the connections).

Figure 8:
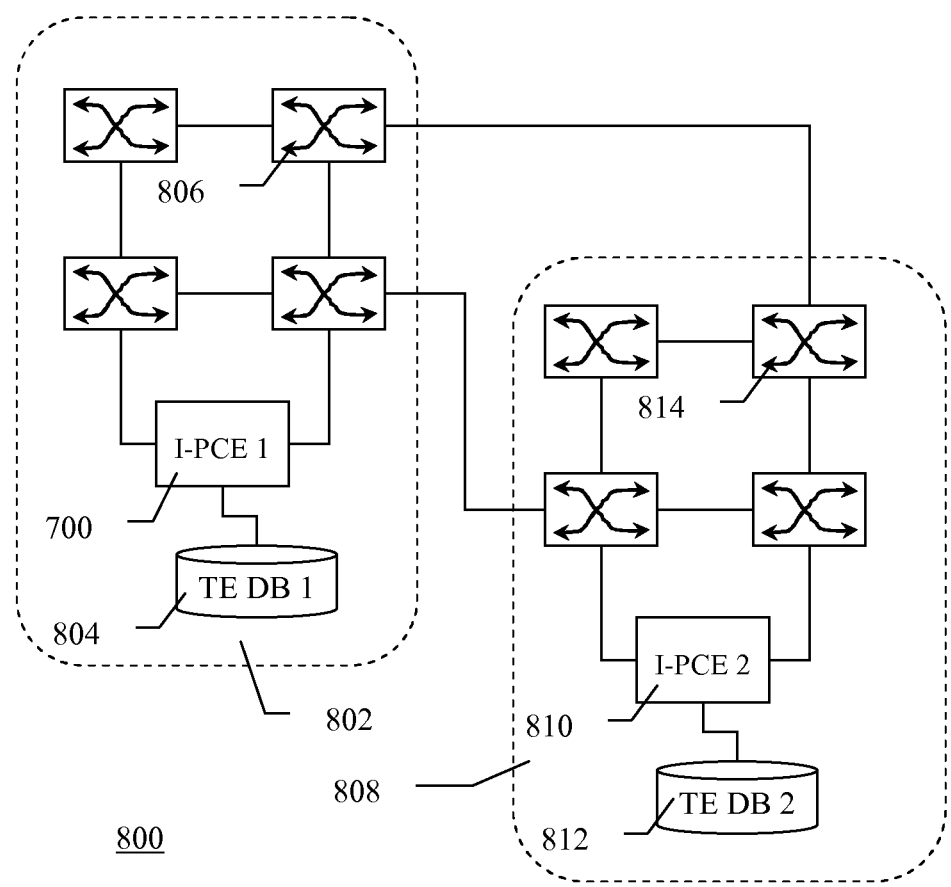
FIG. 8 is a diagram illustrating a communications network using a device for building a summarised topology in one embodiment of the present invention.

FIG. 8 illustrates one embodiment of a communications network, 800, for example, an MPLS network, with an I-PCE, 700, operating and having internal structure as in the embodiments described earlier. The network, 800, comprises a first network domain, 802, and a second network domain, 808. Each domain, 802 and 808, comprises a number of network elements, 806, 814, for example switches and/or routers. The first domain has a first internal path computation element (I-PCE 1), 700, connected to a first traffic engineering database (TE DB 1), 804. The second domain 808, has a similar structure with I-PCE 2, 810 and TE DB 2, 812.

The proposed invention provides the summarization of a domain's topology according to a set of technology-independent service-oriented and economic-driven Class of Services (CoS) by defining an innovative domain topology summarization method that:

1. provides scalability to the summarized topologies by representing a large set of connections between a given couple of BNs as a small number of Summary Links, with different characteristics. This way, the topology of a domain is kept small and, at the same time, its connectivity capabilities are clustered into different Class of Services (CoS);

2. provides stable summarized topologies (i.e. robust to resources status changes) thanks to a set of sub-sequential expedients that minimize the resource sharing among paths and re-compute specific paths with the aim of minimizing the updates to the dynamic advertised values;

3. keeps confidentiality of the domain information by hiding the number, type and TE characteristics of the intra-domain paths. As a matter of fact, only the availability of an undefined set of connections, with some delay and bandwidth characteristics is advertised, with no details about their composition, TE parameters, etc;

4. provides connections with efficient resources' utilization by providing an adequate level of detail of the service-oriented characteristics (i.e. bandwidth and delay), which allow the knowledge of some surely met requirements (i.e. the guaranteed bandwidth and the E2E delay range advertised for each SL).

The invention claimed is:

1. A method of building a summarized topology of a communications network comprising:
   receiving Class of Service (CoS) settings defined by a plurality of CoS baskets, wherein respective CoS baskets are defined by a specific combination of a range of delay and a range of bandwidth;
   receiving traffic information;
   receiving traffic demands for traffic between a pair of border nodes;
   building an Expected Traffic Matrix (EM) based on the CoS baskets and the traffic information to route the traffic demands to corresponding CoS baskets represented in the EM, based on respective bandwidth and delay requirements associated with the traffic demands;
   for a particular traffic demand in the EM, selecting a path in the CoS basket which meets the bandwidth and delay requirement of the particular traffic demand;
   associating each CoS basket with a Summary Link connecting the pair of border nodes, wherein the Summary link represents a set of connections;
   building a summarized topology of the network, wherein the pair of border nodes is linked by the Summary Links corresponding to the CoS baskets;
   monitoring a number of paths in a first CoS basket with bandwidth equal or higher than a guaranteed bandwidth to check if the number is above a threshold; and
   determining that the number of paths in the first CoS basket with the bandwidth equal or higher than the guaranteed bandwidth is below the threshold, and in response;
   creating a new set of traffic demands compatible with parameters of the first CoS basket;
   routing the new set of traffic demands with a constraint that resources assigned to paths that are currently in any of the CoS baskets are not available; and
   responsive to finding a path with desired characteristics, refilling the first CoS basket with the path.

2. The method according to claim 1, wherein the traffic information is received in form of a traffic matrix.

3. The method according to claim 1, wherein the traffic information is received in form of stochastic distributions.

4. The method according to claim 1, wherein each traffic demand, for which a path has been created, has a specified bandwidth, delay, source, and destination.

5. The method according to claim 4, further comprising:

responsive to receiving the particular traffic demand, determining the CoS basket for the particular traffic demand to route, and selecting from the CoS basket, the path to serve the particular traffic demand, the selected path having a smallest bandwidth equal or greater than the specified bandwidth of the particular traffic demand.

6. The method according to claim 5, wherein remainder bandwidth of the path selected to serve the traffic demand is available for serving another traffic demand by recording its availability in a traffic engineering database (TE DB).

7. The method according to claims 1, further comprising:
responsive to determining that no path with the desired characteristics is found, determining whether there is still at least one path with a bandwidth greater or equal to the guaranteed bandwidth in the first CoS basket; and
responsive to determining that no such path is found in the first CoS basket, updating dynamic parameters of the first CoS basket and modifying the resources of the summarized topology.

8. A device that builds a summarized topology of a communications network comprising:
an interface operative to receive Class of Service (CoS) settings, traffic information, and traffic demands for traffic between a pair of border nodes, wherein the CoS settings are defined by a plurality of CoS baskets and wherein respective CoS baskets are defined by a specific combination of a range of delay and a range of bandwidth; and
a processor operative to build an Expected Traffic Matrix (EM) based on the CoS baskets and the traffic information to route the traffic demands to corresponding CoS baskets represented in the EM, based on respective bandwidth and delay requirements associated with the traffic demands, wherein the processor is further operative, for a particular traffic demand in the EM, to select a path from a plurality of paths in the CoS basket which meets the bandwidth and delay requirement of the particular traffic demand, and in which the processor is also operative to associate each CoS basket with a Summary Link that connects the pair of border nodes, wherein the Summary link represents a set of connections in order to build a summarized topology of the network, and wherein the pair of border nodes is linked by the Summary Links corresponding to the CoS baskets, and wherein the processor is further operative to monitor a number of paths in a first CoS basket with bandwidth equal or higher than a guaranteed bandwidth to check if the number is above a threshold, and when determined that the number of paths in the first CoS basket with the bandwidth equal or higher than the guaranteed bandwidth is below the threshold;
create a new set of traffic demands compatible with parameters of the first CoS basket;
route the new set of traffic demands with a constraint that resources assigned to paths that are currently in any of the CoS baskets are not available; and
responsive to finding a path with desired characteristics, refill the first CoS basket with the path.

9. The device according to claim 8, further including a topology module that is operative to build the summarized topology of the network, wherein the processor and the topology module are implemented in the same hardware element in the device.

* * * * *